(12) United States Patent
Heiskell et al.

(10) Patent No.: US 12,404,749 B2
(45) Date of Patent: *Sep. 2, 2025

(54) WELLSITE GREENHOUSE GAS REDUCTION AND HYDROGEN PRODUCTION SYSTEM AND METHOD

(71) Applicant: AES SEDAI Technology, LLC, The Woodlands, TX (US)

(72) Inventors: Alicia Heiskell, The Woodlands, TX (US); Wesley Heiskell, The Woodlands, TX (US); Claire Fuselier Guillory, New Iberia, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/794,971

(22) Filed: Aug. 5, 2024

(65) Prior Publication Data

US 2024/0392655 A1 Nov. 28, 2024

Related U.S. Application Data

(63) Continuation-in-part of application No. 18/514,357, filed on Dec. 5, 2023, now Pat. No. 12,055,018, which is a continuation of application No. 17/939,379, filed on Sep. 7, 2022, now abandoned, which is a continuation of application No. 17/829,222, filed on May 31, 2022, now Pat. No. 11,466,546.

(Continued)

(51) Int. Cl.
*E21B 34/16* (2006.01)
*B01D 53/34* (2006.01)
*B01D 53/86* (2006.01)
*E21B 41/00* (2006.01)
*E21B 43/34* (2006.01)

(52) U.S. Cl.
CPC ........ *E21B 41/0071* (2013.01); *B01D 53/346* (2013.01); *B01D 53/8631* (2013.01); *E21B 34/16* (2013.01); *E21B 43/34* (2013.01)

(58) Field of Classification Search
CPC ....... E21B 34/16; E21B 43/34; E21B 41/0071
USPC ....................................................... 166/260
See application file for complete search history.

(56) References Cited

U.S. PATENT DOCUMENTS

| | | |
|---|---|---|
| 3,372,410 A | 3/1968 | Hindman |
| 3,556,212 A | 1/1971 | Vazquez et al. |

(Continued)

FOREIGN PATENT DOCUMENTS

WO  WO01053675  7/2001

*Primary Examiner* — William D Hutton, Jr.
*Assistant Examiner* — Ashish K Varma
(74) *Attorney, Agent, or Firm* — HULSEY P.C.

(57) ABSTRACT

A system and a method for reduction or elimination of environmentally harmful or "greenhouse" gases in situations in which gaseous hydrocarbons are flared or vented from an oil and gas well are disclosed. The system configures to inject a chemically reactive, or dispersive, or reactive and dispersive atomized mist into a gas flow line leading to a flare stack. The mist reacts with the gas in the flow line to convert methane to hydrogen and carbon monoxide and to reduce other harmful gases, facilitating a clean-burning, compact flare of blue color due to the presence of primarily hydrogen, some carbon monoxide, and a small amount of residual methane. The hydrogen and carbon monoxide are captured and stored before reaching the ignition point at the top of the flare stack.

20 Claims, 8 Drawing Sheets

Related U.S. Application Data

(60) Provisional application No. 63/167,575, filed on Mar. 29, 2021.

(56) References Cited

U.S. PATENT DOCUMENTS

| | | | |
|---|---|---|---|
| 3,602,299 A | 8/1971 | Mozic | |
| 5,197,826 A | 3/1993 | Korloo | |
| 11,466,546 B1 | 10/2022 | Heiskell | |
| 2007/0215356 A1* | 9/2007 | Leeb | E21B 21/10 166/325 |
| 2015/0147255 A1* | 5/2015 | Hyde | B01D 53/864 423/245.3 |
| 2015/0233530 A1* | 8/2015 | Sandidge | E21B 43/16 137/565.11 |
| 2019/0162051 A1* | 5/2019 | Hoffman | E21B 27/02 |
| 2020/0392802 A1* | 12/2020 | Quero | E21B 33/14 |
| 2021/0239315 A1 | 8/2021 | Pape | |
| 2022/0113026 A1 | 4/2022 | Amoudi | |

* cited by examiner

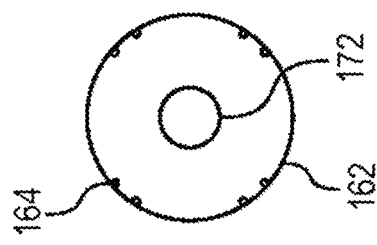
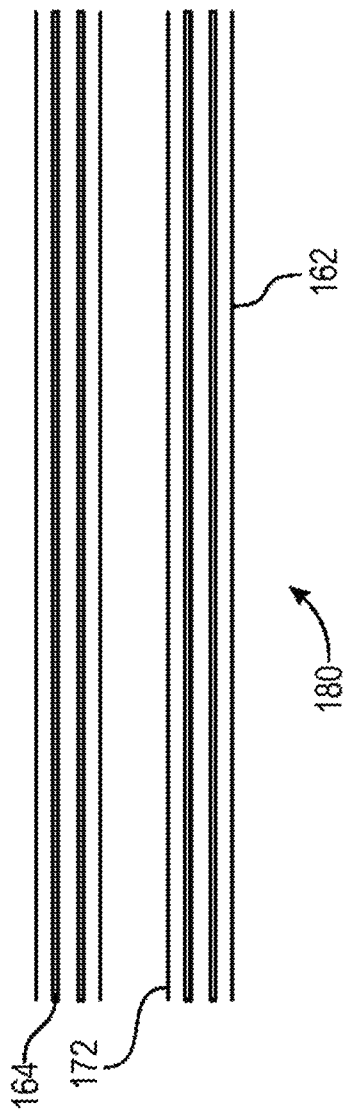

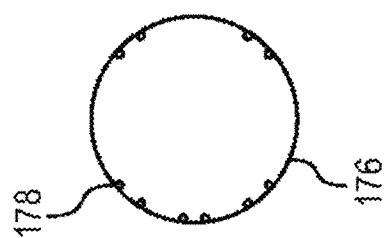
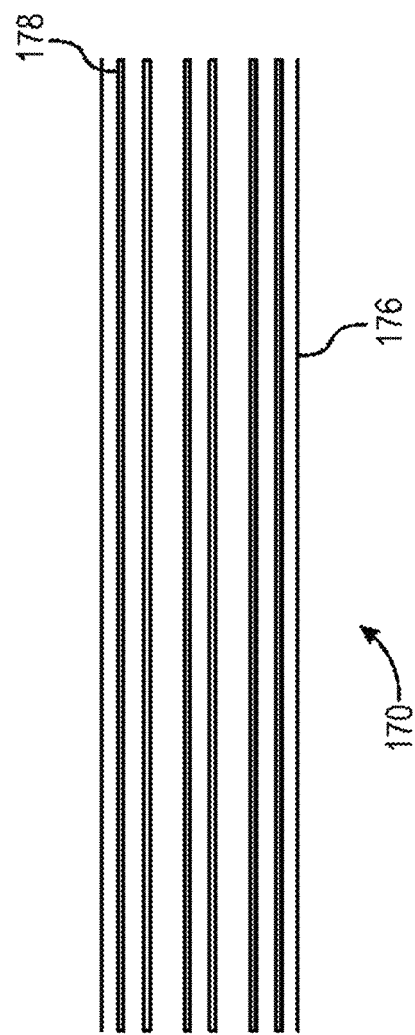

WELLSITE GREENHOUSE GAS REDUCTION AND HYDROGEN PRODUCTION SYSTEM AND METHOD

CROSS-REFERENCE TO RELATED APPLICATIONS

The present application is a continuation-in-part of U.S. patent application Ser. No. 18/514,357, filed Dec. 5, 2023; which is a continuation of U.S. patent application Ser. No. 17/939,379, filed Sep. 7, 2022 (now abandoned); which is a continuation of U.S. patent application Ser. No. 17/829,222, filed May 31, 2022 (now U.S. Pat. No. 11,466,546); which claims benefit of U.S. Provisional Application No. 63/167,575, filed Mar. 29, 2021; all which are incorporated herein in their entirety and referenced thereto.

BACKGROUND OF THE INVENTION

Field of the Invention

The present invention relates in general to reduction of greenhouse gases and production of hydrogen through environmentally sound operations in the oil and gas industry. More particularly, the present invention relates to a method and system for limiting or eliminating environmentally harmful gas and liquid hydrocarbons that can escape an oil and gas well due to venting or flaring operations while converting the environmentally harmful gas and liquid hydrocarbons to beneficial products, such as hydrogen.

Description of the Prior Art

It is known that natural gas produced from an oil and gas wellbore leads to a lot of wastage. The waste or mishandling of excess natural gas produced from the oil and gas wellbore, especially flow back gas produced during well drilling and completion, has long been a topic of concern among the US government, supporters of the environment, and the oil and gas industry. The natural gas waste primarily consisting of methane gas has come under increasing scrutiny due to its harmful environmental effects as a greenhouse gas. The technological trends that have made increased hydrocarbon production from shale gas feasible have brought a significant volume of wells with relatively short production lives into existence, and with them, substantial quantities of excess natural gas that is flared, or worse, vented into the atmosphere.

For the purposes of present disclosure, the natural gas and methane gas are acknowledged to be different, with natural gas flowing from below the surface being composed of methane as well as additional gases and liquids. Methane present in natural gas is produced from the wellbore concomitantly with nitrogen, helium, and natural gas liquids such as ethane, which occurs as gas or liquid, propane, normal butane, isobutene and natural gasoline (known as "naphtha"), in descending order of quantity produced. Further, it is assumed that natural gas flowing from a wellbore contains primarily methane gas, whose conversion is the focus of this disclosure.

Standard well completion practices in the oil and gas industry commonly involve fracturing, i.e., "fracking," the formation rock extending laterally from the wellbore in order to maximize the flow of hydrocarbons. Those skilled in the art know that fracs are achieved by pumping fluid and/or gas, which may include or be associated with CO2 gas, into formation rock under significant pressure. When the fracking operation is complete, the frac fluid, as well as reservoir fluid and gas, flow back, i.e., flow uphole, to the surface. During these flow back operations or subsequent production operations, a separator is generally utilized to separate liquid hydrocarbons from gaseous hydrocarbons, and in some cases, water.

Under ideal circumstances, a well could be brought into remunerative production at this early stage, however, as is frequently the case, there may be no pipeline or means of transporting the gas from the wellbore site to market. This lack-of-pipeline scenario affects wells with flow back gas and also completed wells whose primary purpose is intended to be natural gas production. Irrespective of the underlying reasons for the presence of gas on location, without access to a pipeline, or reasonable means of utilizing the gas at hand, both providing safety and production-related economic issues have often resulted in the unsatisfactory practices of venting or flaring of the gas when no other means of handling it is available or feasible.

After exiting the wellbore, flowing natural gas must generally pass through a separator, whose primary purpose is to separate associated liquid from the gas. Following separation, i.e., after the flowing natural gas exits the separator, current practices often involve the detrimental practice of venting the gas into the atmosphere or, alternatively, sending it through a flare stack, where the gas is ignited and combusted. The separated, primarily gaseous stream of hydrocarbons contain methane as well as, potentially, various undesirable contaminants such as hydrogen sulfide (H2S), carbon dioxide (CO2) and water. Flaring of the separated gas eliminates most of the methane, yet still emits environmentally detrimental gases including, but not limited to, CO2, a greenhouse gas. In the United States, aggregate reported flaring in the Permian Basin alone in 2019 reached approximately 0.5 billion cubic feet per day.

In spite of increased societal and regulatory scrutiny, the venting of methane gas directly into the atmosphere remains a significant issue. Both venting and flaring remain, incredibly, standard practices around the globe. Venting methane gas is considered to be a far worse practice than flaring. The harmful environmental effects of methane released directly into the atmosphere, including its contribution to global warming, are estimated to be 20 to 80 times worse than the effects of released CO2 from flaring.

After flaring of gas is initiated, it may be necessary to continue the practice for extended periods of time in order to prevent the risk of explosions inherent in either the shutting in of high-pressure wells or the venting of large amounts of uncombusted reactive gases, as well as for the removal of unwanted components or volatile organic compounds. Operators are also reluctant to completely shut in wells for extended periods of time due to uncertainty as to whether production can be resumed at roughly the same level when the well is reopened. All of these factors lead to extended periods for flaring and venting. Certainly, the longer the period required for flaring, the greater the volume of undesirable CO2 as well as other environmentally harmful gases that will continue escaping into the atmosphere.

Flaring is not limited to completion and production in the oil and gas industry. The chemical refining industry also utilizes flaring, with reactive gas flares integrated into many processes within a refinery. For providing safety, refineries must keep flares burning continuously and indefinitely in many processes, and face many of the same issues as operators producing gas from wellbores.

Alternatives to venting and flaring involve locally capturing and storing the gas, converting it to electricity, converting it to electricity with the aim of generating block chain or cryptocurrency products, or converting it to other gas-based products. Traditionally, these alternatives require significant capital in order to employ them, and the economics of a given well location or field may not support such capital investment.

Hydrogen, an increasingly valuable clean energy fuel, is split from methane gas molecules. When examining the various means of producing hydrogen from methane gas, a process known as steam methane reforming has long been regarded as the most standard, high-yield high-cost commercial technology for converting methane to hydrogen. Steam methane reforming (SMR) requires significant heat of 700°-1,000° C. and is relatively capital intensive and energy intensive. SMR requires significant process infrastructure and investment, and is generally not suitable for a single wellsite or cluster of wellsites. With this in mind, other methane conversion technologies have been researched in recent decades with the goal of converting methane through means utilizing less energy and heat. Among these are systems that produce varieties of electrochemically catalytic, enzymatically biocatalytic, thermocatalytic, photocatalytic and still other types of methane conversion reactions.

Nonetheless, many of these alternative methods of producing hydrogen from methane are still costly and unproven in large-scale, large-volume reactions, such as those required for flowing natural gas wells. Furthermore, availability of such technologies for use at any well location is extremely limited at best, and in general nonexistent. Thus, the problem remains, certainly, that significant cost and lack of availability of methane conversion technologies in remote locations continues to contribute to the extensive, ongoing practices of flaring and venting.

Therefore, there is a need in the art to provide a less costly means of converting methane gas to hydrogen, intended to provide significant savings in comparison with local compression and storage of natural gas or on-site power generation while eliminating methane emissions into the atmosphere.

SUMMARY OF THE INVENTION

It is an object of the present invention to provide a system and a method to eliminate methane emissions into the atmosphere.

It is an object of the present invention to employ a method and system for converting methane to hydrogen while simultaneously limiting environmentally harmful gaseous emissions. The environmentally harmful gases, including gases commonly referred to as "greenhouse gases," or "GHG," such as methane and CO2 gases that escape during the venting or flaring of hydrocarbons from an oil and gas well or chemical refinery processes.

It is another object of the present invention to provide a system for limiting or eliminating environmentally harmful gas and liquid hydrocarbons that can escape an oil and gas well due to venting or flaring operations while converting the environmentally harmful gas and liquid hydrocarbons to beneficial products, such as hydrogen.

It is yet another object of the present invention to provide a system having interchangeable modules to employ different methods of methane gas conversion, with the option to employ the methods either separately or additively.

The preferred embodiment employs an insertable/installable module which houses a nozzle or plurality of nozzles (atomized nozzles) delivering an atomized mist composed of a defined chemical catalyst to the interior of said module. The module (atomized nozzle) is placed within, or proximal to, a gas separator connected to a producing wellbore, such that methane flows through the module in order to contact the atomized mist. The preferred embodiment represents an improved method for methane reforming, as it does not require steam or a heat source in order to facilitate a reaction. A high-hydrogen content synthetic gas ("syngas"), consisting largely of hydrogen and carbon monoxide, results from exposure of flowing methane to the atomized mist of the chemical catalyst. This syngas is captured, subjected to other processes, combusted, or combusted and subjected to other processes, all depending on desired results. The hydrogen is ostensibly captured separately from the carbon monoxide in a metal hydride-filled tank.

In another embodiment, the methane is passed through a module (light reactor module) in which a UV light source, hydrogen-splitting particulate elements, and methane commingle to enable photocatalytic conversion of a portion of the methane to hydrogen.

In another embodiment, a module (hydroxyl generator system) is used separately or in conjunction with the two embodiments described. The module is positioned downstream from the module of the preferred embodiment and contains a hydroxyl generator delivering hydroxyl radicals to the interior of a tubular while methane passes through said tubular, with the hydroxyl radicals converting a portion of the carbon monoxide reactively produced from the upstream chemical catalyst to carbon dioxide.

In each of the disclosed embodiments, additional methods for processing gas and liquids, all known in the art, may be added to the embodiments in order to achieve desired results. Water shift reactions, Fischer-Tropsch reactions, amine solvent CO2 removal, metal-based CO removal, and non-metal-based CO removal, among other reactions may be incorporated into the disclosed embodiments in order to ensure end product and emission goals.

In utilizing the preferred embodiment and method of this disclosure, delivering the specific chemical catalyst as an atomized mist to the methane gas before it is otherwise flared or vented, the chemical catalyst mist will react with the flowing gas stream so as to reform and/or remove methane, hydrogen sulfide, and other environmentally harmful gases present in the flowing gas stream prior to being combusted in a flare stack. As noted above, other processes, known in the art, could be added to effect a different result than simply flaring the gas. The preferred embodiment of this disclosure is designed to apply a quantity of chemical catalyst mist adequate to commingle and react with nearly all, such as 95%, of methane from this flowing gas stream in advance of the flare, leaving mostly hydrogen and some carbon monoxide, known in the art as synthetic gas, or "syngas," as well as a small amount of residual methane, so as to produce a small, clean-burning, primarily hydrogen-based flare as it exits the flare stack.

Alternative methods known in the art exist for handling the syngas in place of, or in addition to, burning it in a flare stack. These include autothermal reforming (ATR) or steam reforming (SR) combined with a non-isothermal water gas shift (WGS) reaction followed by either CO preferential oxidation or CO selective methanation to effectively remove CO from syngas; a Fischer-Tropsch process for producing synthetic petrochemicals; reactive metals-based methods for capture of CO; metal-free 1,5,7-Triazabicyclo[4.4.0]dec-5-ene (TBD) facilitated CO capture and utilization (see "Metal-free Carbon Monoxide (CO) Capture and Utilization: Formylation of Amines," Hyeonga-Wan Noh et al, Advanced Synthesis and Catalysis 361 1-7, 2019); solvent-based CO2 removal through absorption, utilizing, as examples, the primary amine monoethanolamine or hydroxypropyl cellulose if low temperatures and pressures are achievable; CO2 removal through physical adsorption utilizing zeolite adsorbers with relatively high pressures; CO2 removal utilizing multistage, high-pressure fluidized bed reactors with amine impregnated activated carbon; CO2 removal through high pressure membrane filters; and other methods proven or currently in development. Produced hydrogen is captured and stored, such as in a metal-hydride-containing vessel or pressure vessel, depending on the methods employed. The embodiments in this disclosure focus on methods for conversion of methane to hydrogen rather than the additional processes that may be employed to handle produced hydrogen and carbon monoxide or carbon dioxide.

The chemical catalyst mist utilized in the primary embodiment is comprised mainly of a surfactant with a quantity of water and acts to reduce temperature of the flame at the flare's ignition point, generally preventing the formation and emission of NOx pollutants that could occur when the flare burns in contact with surrounding air in the atmosphere. The observed flare with chemical catalyst mist added into the gas flow line upstream from the ignition point of the flare stack exhibits a smaller, cleaner, relatively smoke-free bluish flame in comparison with untreated flow line gas, which burns with a tall, orange flame and some visible, residual dark smoke. The observed flare with the chemical catalyst mist added burns at below 1430° C., avoiding the creation of NOx pollutant gases.

In order to achieve this at a wellbore location, a storage tank containing the defined chemical catalyst connects and conducts to a flowing wellbore gas/methane stream via a network of real-time adjustable pumps and valves with integrated sensors. Additional sensors are deployed on a drone (unmanned aerial vehicle (UAV)) to measure emissions when flying above and around the gas flare. The chemical catalyst is pumped through the valves until it reaches an atomizing nozzle or plurality of nozzles, at which point a fine atomized mist of said chemical catalyst is introduced to the flowing gas stream before flaring. The atomizing nozzle is housed within an onsite gas separator or within a modular assembly connected to the separator's gas outflow, or further downstream disposed within some portion of the flow pipe, but preferably proximal to the separator. The placement of the module containing the atomizing nozzle within or near the separator enables maximal mixing or commingling of the atomized mist with the flowing gas stream in a turbulent environment. This placement of the module also provides maximal distance and time for the reaction between methane and the chemical catalyst to occur before the flowing gas stream reaches the flare stack ignition or exit point.

An additional embodiment involves passing methane through a module, which utilizes a section of chromed pipe as a housing, in which a UV light source, hydrogen-splitting particulate elements, and methane commingle to enable photocatalytic conversion of a portion of the methane to hydrogen. The hydrogen-splitting particles include a metal oxide. Historically, palladium, platinum and nickel have been used successfully to produce substantial hydrogen yields from methane. More recently, less costly metal oxides, used as combustion catalysts containing copper, manganese, iron or chromium, have been paired with a nickel reforming catalyst to carry out the partial oxidation of methane. These catalysts produce hydrogen yields that are comparable to platinum or palladium and nickel catalysts, but at significantly lower costs. Advances in materials used to facilitate hydrogen-splitting, light-based reactions are known to those skilled in the art, including light wavelengths required for optimal reactivity. The focus of this particular embodiment of this disclosure, however, is the novel method of arranging plug-in modules containing photocatalytic chambers within the system set forth in the preferred embodiment above.

Yet another embodiment is comprised of a module containing a hydroxyl generator delivering hydroxyl radicals to the interior of a tubular while methane passes through said tubular, with the hydroxyl radicals converting a portion of the produced carbon monoxide to carbon dioxide, if desired as an additional process.

The disclosed invention offers significant advantages over existing technologies for methane conversion to hydrogen. The instant disclosure provides a new method for greatly reducing, to the point of nearly eliminating environmentally harmful gases that can escape an oil and gas well during flaring. The preferred embodiment of this disclosure can be procured and installed at a fraction of the cost of other methane reducing or converting technologies, such as traditional steam methane reforming (SMR) technology (requiring significant equipment and energy, including the capability to heat to temperatures of 700-1,100 degrees Celsius). The disclosed invention can function without steam or a heat source. Furthermore, the disclosed invention can be installed rapidly, within a few hours of arriving at a gas well location. The disclosed invention also comprises a system that is compact, making it more portable than other systems in the art, and with readily available components that would make system availability feasible even in the most remote locations, on short notice.

The instant disclosure additionally provides a method for converting methane gas to storable hydrogen and carbon monoxide. Furthermore, the disclosed methods are based upon readily available components and inputs, making for a lower cost solution in comparison with other alternative approaches geared at reformation, processing, or electrification of methane gas.

The disclosed invention is tunable, meaning that, in the preferred embodiment, the concentration of the chemical catalyst in relation to the flowing gas stream can be finely adjusted so as to limit methane outflow and the size of the flare accordingly, or, alternatively, to eliminate all methane and extinguish the flare entirely. Similarly, in the additional embodiments, additional sections of photocatalytic reactive chambers and/or hydroxyl generators may be added. Additionally, the embodiments may be configured such that gas may be recirculated through the system in order for additional reactions to occur before the gas exits the system.

Features and advantages of the subject matter hereof will become more apparent in light of the following detailed description of selected embodiments, as illustrated in the accompanying FIGUREs. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

FIGS. 3A and 3B illustrate a cross-sectional view and an axial view, respectively of a light reactor module comprising a flow pipe and a UV light source, in accordance with one embodiment of the present invention.

FIGS. 7A and 7B illustrate a front schematic representation and a side schematic representation, respectively of a hydroxyl generator system, in accordance with one embodiment of the present invention.

DETAILED DESCRIPTION OF THE PREFERRED EMBODIMENT

Figure 1:
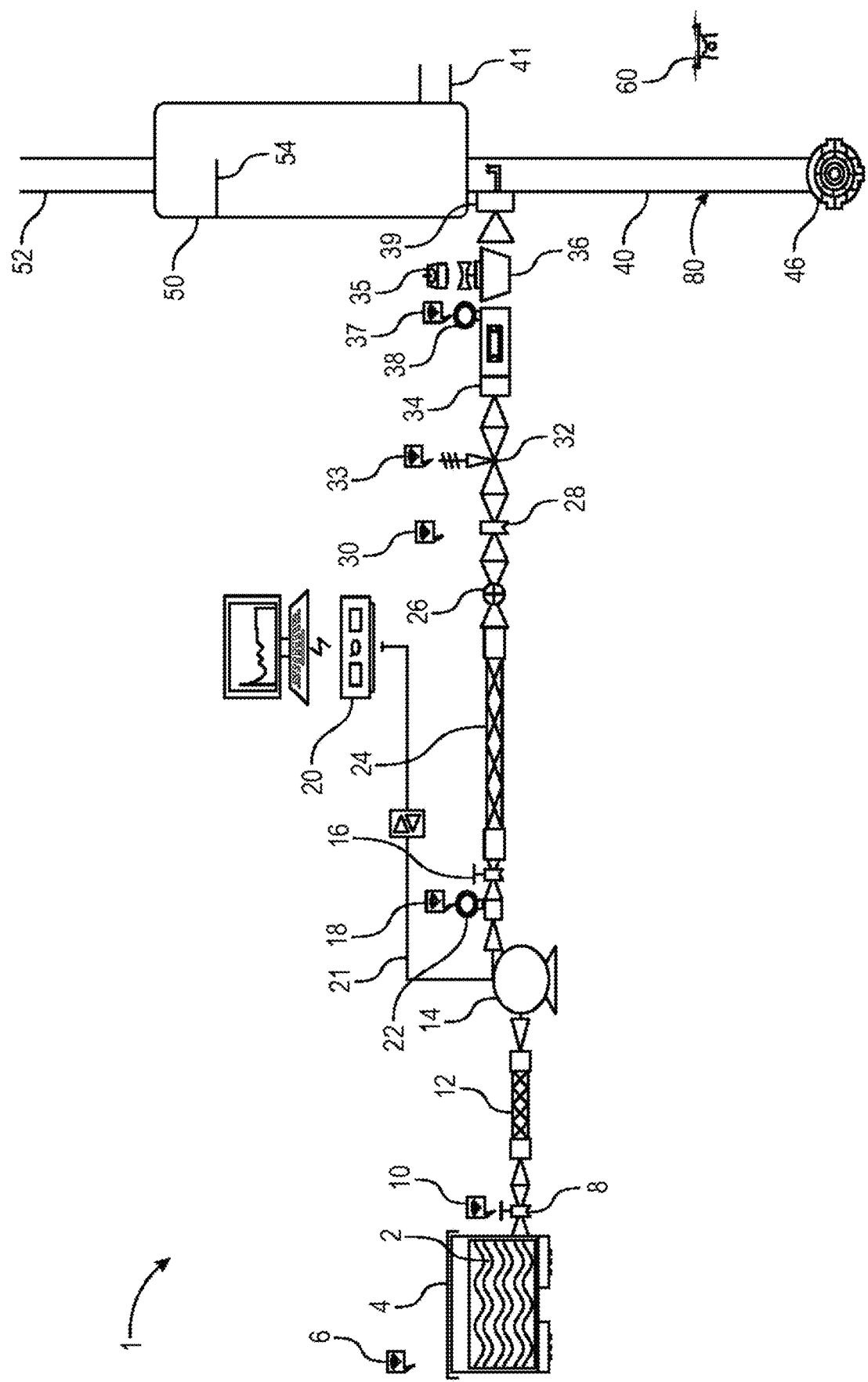
FIG. 1 illustrates a schematic representation of a system for limiting or eliminating environmentally harmful gas and liquid hydrocarbons, in accordance with one embodiment of the present invention.

The detailed description set forth below in connection with the appended drawings is intended as a description of exemplary embodiments in which the presently disclosed invention may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed system. However, it will be apparent to those skilled in the art that the presently disclosed invention may be practiced without these specific details. In some instances, well-known structures and devices are shown in functional or conceptual diagram form in order to avoid obscuring the concepts of the presently disclosed system.

In the present specification, an embodiment showing a singular component should not be considered limiting. Rather, the invention preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present invention encompasses present and future known equivalents to the known components referred to herein by way of illustration.

Although the present invention describes a system, it is to be further understood that numerous changes may arise in the details of the embodiments of the system. It is contemplated that all such changes and additional embodiments are within the spirit and true scope of this invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the invention and are not intended to limit the scope of the invention.

It should be understood that the present invention describes a method and system for reduction or elimination of environmentally harmful or "greenhouse" gases in situations in which gaseous hydrocarbons are flared or vented from an oil and gas well. In order to limit harmful gas emissions, the disclosed system injects a chemically reactive, or dispersive, or reactive and dispersive atomized mist into a gas flow line leading to a flare stack. The mist reacts with the gas in the flow line so as to convert methane to hydrogen and carbon monoxide and also to reduce other harmful gases, facilitating a clean-burning, compact flare of blue color due to the presence of primarily hydrogen, some carbon monoxide, and a small amount of residual methane. The hydrogen and carbon monoxide are captured and stored before reaching the ignition point at the top of the flare stack.

In an alternative embodiment, hydroxyl radicals (OH—) are produced within the flow line by adding a module that contains an electrically operated UV light, a "hydroxyl generator," and water reaction. UVA (black light) in the 365 nm to 385 nm wavelength is produced to irradiate titanium dioxide ($TiO_2$) nanoparticles to efficiently generate hydroxyl radicals. The module containing the hydroxyl generator could be installed into the flow line in order to convert CO to $CO_2$, if desired.

The preferred embodiment of the present invention utilizes a chemical catalyst 2 such as a surfactant composed of 4 to 40 parts of a C16-C18 tertiary amine having 2-10 ethoxy or other solubilizing groups per mol, 1 to 15 parts of a carboxylic acid having 6 to 16 carbon atoms; 1 to 6 parts of a C6-C16 alcohol and 0 to 10 parts of C4- and lower alcohols, and enough water to create a total of 100 parts by volume, as in the embodiment described in the U.S. Pat. No. 5,945,026 "Composition and Methods for Firefighting Hydrocarbon Fires." Alternatively, the chemical catalyst 2 includes a surfactant comprised of 4 to 40 parts of a tertiary amine having 2-10 ethoxy or other solubilizing groups per mol selected from the group consisting of one or more of a series of similar homologs or isomers of C16-C18 animal-based tallow amines and coconut amines, 1 to 15 parts of a carboxylic acid having 6 to 16 carbon atoms or homolog thereof; 1 to 6 parts of a C6-C16 alcohol or homolog thereof and 0 to 10 parts of C4 and lower alcohols or homologs thereof, and enough water to create a total of 100 parts by volume, as described in the U.S. Pat. No. 6,645,390 "Composition and Methods for Firefighting Hydrocarbon Fires," or a similar chemical catalyst based on anticipated wellbore gas content. Commercial versions of acceptable chemical catalysts 2 are available in the marketplace, such as VaporAde Plus™ from EnforcerOne LLC.

Various features and embodiments of a system for reduction or elimination of environmentally harmful or "greenhouse" gases in situations in which gaseous hydrocarbons are flared or vented from an oil and gas well are explained in conjunction with the description of FIGS. 1 to 8.

Turning to FIG. 1 and the preferred embodiment, a system 1 including a storage tank 4 storing a chemical catalyst 2 is shown, in accordance with one embodiment of the present invention. Storage tank 4 incorporates a fluid level sensor 6 capable of wired or wireless communication with a computer or controller 20. Storage tank 4 includes a tank valve 8. Tank valve 8 integrates a flow sensor 10. Computer 20 operates tank valve 8 via a wired or wireless communication to control the flow from storage tank 4. Flow sensor 10 detects the flow rate and communicates the data to computer 20. Tank valve 8 threadably attaches to a hose 12, through which chemical catalyst 2 further flows to a high-pressure pump 14. In the present embodiment, computer 20 controls the operation of high-pressure pump 14. Chemical catalyst 2 is further pumped through a pump valve 16. Pump valve 16 encompasses an integrated pressure sensor 18 capable of communicating with computer 20. Pump valve 16 includes a manually-readable pressure gauge 22. In one example, high-pressure pump 14 communicates the data to computer using a cable or computer cable 21.

Pump valve 16 connects to a high-pressure hose 24. Chemical catalyst 2 flows from the pump valve 16 to high pressure hose 24. High pressure hose 24 attaches to a pressure relief valve 26. Chemical catalyst 2 flows from high pressure hose 24 to pressure relief valve 26. Pressure relief valve 26 connects to a flow control valve 28. Flow control valve 28 integrates a valve position sensor 30. Flow control valve 28 regulates pressurized flow of chemical catalyst 2 further downstream, toward a gas flow line 80. Computer 20 controls flow control valve 28 remotely and obtains the real-time flow data from valve position sensor 30 to make operational decisions. Further, valve position sensor 30 connects to a flow meter 32. Flow meter 32 integrates a flow meter sensor 33. Flow meter 32 connects to flow control valve 28 at one end and a back flow valve 34 at another end. Flow meter 32 communicatively connects to computer 20 via flow meter sensor 33. Computer 20 obtains the flow data from flow meter sensor 33 and controls the operation of flow meter 32.

Back flow valve 34 connects to a plug valve 36 at its distal end. Plug valve 36 acts as a master shut-off valve to prevent any flow of chemical catalyst 2 into gas flow line 80, as well as to prevent any backflow of gas from flow line 80 in the direction of storage tank 4 beyond plug valve 36 to occur, when plug valve 36 is in the closed position. Plug valve 36 is operable via manual or remote electrical operation with an integrated driver 35 that connects by wire or wirelessly with computer 20. Back flow valve 34 includes an integrated pressure sensor 37 and a back-pressure gauge 38 with an analog or digital readout. In accordance with the present invention, back flow valve 34 immediately closes in order to prevent damage to components in system 1 or a potentially dangerous rupture in system 1. In other words, in the event of an unexpected pressure event, or a situation in which the flow is suddenly shut off at the back flow valve 34 and/or at plug valve 36 resulting in a build in pressure between high pressure pump 14 and back flow valve 34.

Plug valve 36 connects to back flow valve 34 and an atomizing nozzle (or one or more atomizing nozzles) 44 via an atomizing nozzle valve 39. Atomizing nozzle valve 39 attaches to and through gas flow line 80 and is ported through the wall of gas flow line 80. Atomizing nozzle valve 39 threadably connects to atomizing nozzle 44 within the interior of gas flow line. Gas flow within the interior of gas flow line 80 exits via a separator or gas separator 50 and flows toward flare stack 46. Atomizing nozzle 44 receives flow of chemical catalyst 2 and releases chemical catalyst 2 into the interior of gas flow line 80 in a wide, outwardly-expanding conical mist so as to accommodate laminar flow of the stream of gas within gas flow line 80 and to expose chemical catalyst 2 to all, or nearly all, of the stream of gas as it passes by atomizing nozzle 44 and proceeds toward flare stack 46. Prior to reaching gas flow line, natural gas flow from a wellbore passes through gas inflow line 52, enters separator 50, and impacts diverter plate 54 where natural gas liquid and gas components are separated.

In the area of gas flow line 80 proximal to the separator, the critical reaction in the instant embodiment is initiated. Wellbore gas flowing downstream from separator 50 is exposed to chemical catalyst 2 released from atomizing nozzle 44 causing methane gas, which comprises the large majority of the wellbore gas, to be converted to hydrogen and carbon monoxide.

In operation, chemical catalyst 2 is controllably released from storage tank 4 and pumped by high pressure pump 14 in the direction of atomizing nozzle 44. Atomizing nozzle 44 receives flow of chemical catalyst 2 and releases chemical catalyst 2 into the interior of gas flow line 80 in a wide, outwardly-expanding conical mist so as to accommodate laminar flow of the stream of gas that has exited separator 50 and to expose chemical catalyst 2 to all, or nearly all, of the stream of gas as it passes by atomizing nozzle 44 and proceeds through flow pipe 80 toward flare stack 46. Atomizing nozzle 44 produces a fine mist from its centralized position within separator 50 so as to maximize exposure, commingling and reactivity of the mist with the stream of gas. In one implementation, one or more sensors (not shown) capable of detecting molecular composition of gas are deployed near flare stack 46 on a drone 60 hovering above or around the gas flare to sample gas molecules and provide real-time data concerning post-combustion, post-flare, gas composition, hydrogen capture and concentration to computer 20. The data is used to make decisions regarding the flow, composition and concentration of chemical catalyst 2 in order to adjust said chemical catalyst's 2 reaction with gas in gas flow line 80 for subsequent work.

In one preferred embodiment, one or more sensors capable of detecting molecular composition of gas as well as other metering equipment (not shown) at flare stack 46, can be utilized to collect data for credits, rebates, or other legislative or commercial benefits, such as, potentially, the IRS Section 45Q Carbon Capture and Sequestration Credit or appropriate non-fungible tokens (NFTs) and other cryptocurrencies being examples.

In one alternate embodiment, system 1 includes a simplified, but fewer, components, as compared with the embodiment described above. In the present embodiment, chemical catalyst 2 is stored in storage tank 4. Fluid level sensor 6, cable 21 and computer 20 are omitted. A tank valve 8 (integrated flow sensor 10 is omitted) is attached to storage tank 4. Here, tank valve 8 is operated manually for controlling flow from storage tank 4. Tank valve 8 threadably attaches to hose 12, through which chemical catalyst 2 further flows to high-pressure pump 14. Further, chemical catalyst 2 is pumped for flowing through pump valve 16. Pump valve 16 attaches manually to pressure gauge 22.

Pump valve 16 connects to a high-pressure hose 24. Chemical catalyst 2 flows from pump valve 16 to high pressure hose 24. High pressure hose 24 encompasses a pressure relief valve 26. Chemical catalyst 2 flows from high pressure hose 24 to pressure relief valve 26. Pressure relief valve 26 connects to a flow control valve 28. Flow control valve 28 integrates a valve position sensor 30. Flow control valve 28 regulates pressurized flow of chemical catalyst 2 further downstream, toward a gas flow line 80. Computer 20 controls flow control valve 28 remotely and obtains the real-time flow data from valve position sensor 30 to make operational decisions. Further, valve position sensor 30 connects to a flow meter 32. Flow meter 32 integrates a flow meter sensor 33. Flow meter 32 connects to the flow control valve 28 at one end and a back flow valve 34 at another end.

Flow meter 32 communicatively connects to computer 20 via flow meter sensor 33. Computer 20 obtains the flow data from flow meter sensor 33 and controls the operation of flow meter 32.

Back flow valve 34 connects to a plug valve 36 at its distal end. Plug valve 36 acts as a master shut-off valve to prevent any flow of chemical catalyst 2 into gas flow line 80, as well as to prevent any backflow of gas from flow line 80 in the direction of storage tank 4 beyond plug valve 36 to occur, when plug valve 36 is in the closed position. Plug valve 36 is operable via manually or remote electrical operation with an integrated driver 35 that connects by wire or wirelessly with computer 20. Back flow valve 34 includes an integrated pressure sensor 37 and a back-pressure gauge 38 with an analog or digital readout. In accordance with the present invention, back flow valve 34 immediately closes in order to prevent damage to system 1 components or a potentially dangerous rupture in system 1. In other words, in the event of an unexpected pressure event, or a situation in which the flow is suddenly shut off at back flow valve 34 and/or at plug valve 36 resulting in building of pressure between high pressure pump 14 and back flow valve 34.

Plug valve 36 connects to back flow valve 34 and an atomizing nozzle 44 via an atomizing nozzle valve 39. Atomizing nozzle valve 39 attaches to and through gas flow line 80 and is ported through the wall of gas flow line 80. Atomizing nozzle valve 39 threadably connects to an atomizing nozzle 44 within the interior of gas flow line 80. Gas flow within the interior of gas flow line 80 exits via a separator 50 and flows toward flare stack 46. Atomizing nozzle 44 receives flow of chemical catalyst 2 and releases chemical catalyst 2 into the interior of gas flow line 80 in a wide, outwardly-expanding conical mist so as to accommodate laminar flow of the stream of gas within gas flow line 80 and to expose chemical catalyst 2 to all, or nearly all, of the stream of gas as it passes by atomizing nozzle 44 and proceeds toward flare stack 46.

FIG. 2 shows a system 1 for limiting or eliminating environmentally harmful gas and liquid hydrocarbons, in accordance with another embodiment of the present invention. System 1 includes a storage tank 4 storing a chemical catalyst 2 is shown, in accordance with one embodiment of the present invention. Storage tank 4 incorporates a fluid level sensor 6 capable of wired or wireless communication with a computer 20. Storage tank 4 includes a tank valve 8. Tank valve 8 integrates a flow sensor 10. Computer 20 operates tank valve 8 via a wired or wireless communication to control the flow of chemical catalyst 2 from storage tank 4. Flow sensor 10 detects the flow rate and communicates the data to computer 20. Tank valve 8 threadably attaches to a hose 12, through which chemical catalyst 2 further flows to a high-pressure pump 14. In the present embodiment, computer 20 controls the operation of high-pressure pump 14. Chemical catalyst 2 is further pumped through a pump valve 16. Pump valve 16 encompasses an integrated pressure sensor 18 capable of communicating with computer 20. Pump valve 16 includes a manually-readable pressure gauge 22. In one example, high-pressure pump 14 communicates the data to computer using a cable 21.

Pump valve 16 connects to a high-pressure hose 24. Chemical catalyst 2 flows from pump valve 16 to high pressure hose 24. High pressure hose 24 encompasses a pressure relief valve 26. Chemical catalyst 2 flows from high pressure hose 24 to pressure relief valve 26. Pressure relief valve 26 connects to a flow control valve 28. Flow control valve 28 integrates a valve position sensor 30. Flow control valve 28 regulates pressurized flow of chemical catalyst 2 further downstream, toward a gas flow line 80. Here, computer 20 controls flow control valve 28 remotely and obtains the real-time flow data from valve position sensor 30 to make operational decisions. Further, valve position sensor 30 connects to a flow meter 32. Flow meter 32 integrates a flow meter sensor 33. Flow meter 32 connects to flow control valve 28 at one end and a back flow valve 34 at another end. Flow meter 32 communicatively connects to computer 20 via flow meter sensor 33. Computer 20 obtains the flow data from flow meter sensor 33 and controls the operation of flow meter 32.

Back flow valve 34 connects to a plug valve 36 at its distal end. Plug valve 36 acts as a master shut-off valve to prevent any flow of the chemical catalyst 2 into gas flow line 80, as well as to prevent any backflow of gas from flow line 80 in the direction of storage tank 4 beyond plug valve 36 to occur, when plug valve 36 is in the closed position. Plug valve 36 is operable via manually or remote electrical operation with an integrated driver 35 that connects by wire or wirelessly with the computer 20. Back flow valve 34 includes an integrated pressure sensor 37 and a back-pressure gauge 38 with an analog or digital readout. In accordance with the present invention, back flow valve 34 immediately closes in order to prevent damage to system components or a potentially dangerous rupture in the system. In other words, in the event of an unexpected pressure event, or a situation in which the flow is suddenly shut off at back flow valve 34 and/or at plug valve 36 resulting in building of pressure between high pressure pump 14 and back flow valve 34.

Plug valve 36 attaches to back flow valve 34 (on the end proximal to storage tank 4) and to atomizing nozzle valve 39 (on the end proximal to gas flow line 80). Atomizing nozzle valve 39 attaches to and through separator 50 and is ported through the wall of separator 50. Atomizing nozzle valve 39 connects to multiple nozzle flow tube 48. Here, multiple nozzle flow tube 48 threadably connects to atomizing nozzle valve 39 within the interior of separator 50. Further, multiple-nozzle flow tube 48 threadably attaches to a plurality of atomizing nozzles 44. Gas flow from a wellbore proceeds through gas inflow line 52 and enters separator 50 where it impacts diverter plate 54, separating natural gas liquid and gas components. At this point of gas inflow and extreme turbulence, one atomizing nozzle 44 is disposed so as to expose chemical catalyst 2 thoroughly to the inflowing gas. Separated gas proceeds further through separator 50 and passes to an atomizing nozzle 44 located at the end of separator 50 distal from gas inflow line 52, where the gas is afforded a second opportunity to contact chemical catalyst 2 flowing from atomizing nozzle 44. Next, the gas, now converted in considerable part to hydrogen and carbon monoxide, exits separator 50 and flows through gas flow line 40 toward flare stack 46. Liquids pass out of the separator at liquid outflow line 41.

In one embodiment, system 1 includes one or more sensors (not shown) capable of detecting the molecular composition of gas. One or more sensors are deployed near or on flare stack 46, or on a drone 60 hovering above or around the gas flare, in order to sample gas molecules and provide real-time data concerning post-combustion, post-flare, gas composition and concentration. The data is used to make decisions regarding the flow, composition and concentration of chemical catalyst 2 in order to adjust said chemical catalyst's 2 reaction with gas in gas flow line 80 for subsequent work.

In the present embodiment, the sensors capable of detecting molecular composition of gas as well as other metering equipment (not shown) at the flare stack are used to collect data for credits, rebates, or other legislative or commercial benefits, such as, potentially, the IRS Section 45Q Carbon Capture and Sequestration Credit or appropriate non-fungible tokens (NFTs) and cryptocurrencies, as examples.

FIG. 3A depicts a cross-section of an additional module i.e., light reactor module 180 incorporated into the previous embodiments disclosed above. Advances in materials used to facilitate hydrogen-splitting, light-based reactions are known to those skilled in the art, including light wavelengths required for optimal reactivity. The present embodiment provides a novel method of arranging plug-in reactive modules, such as light reactor module 180, to modify or enhance the embodiments introduced in FIG. 1 and FIG. 2. Light reactor module 180 utilizes light in conjunction with photocatalytic materials such as metal oxides to enable production of hydrogen from methane gas. Principles known in the art involve localized surface plasmon resonance ("LSPR"), meaning the resonant oscillation of conduction electrons in conductive nanostructures when light is applied. Linic, S., Christopher, P., and Ingram, D. B. (2011), Plasmonic-metal nanostructures for efficient conversion of solar to chemical energy, Nat. Mater. 10, 911-921. A reactive material and a plasmonic material is employed to produce an electrical charge through LSPR, and with appropriate material and light wave selection, effectively split hydrogen from methane gas. These materials are layered with a spacer material in between. Light reactor module 180 utilizes scientific LSPR principles taught in the prior art, such as in Halas, Nancy Jean et al, U.S. Pat. No. 10,766,024 B2, and employs them in a new physical embodiment for the large-scale extraction of hydrogen in the field. Light reactor module 180 receives methane flow in the same fashion as gas flow line 80 does in FIGS. 1 and 2, but utilizes coated surfaces and a UV light source such that when hydrogen-splitting particulate elements on the coated surfaces commingle with methane gas while exposed to appropriate-spectrum UV light, a photocatalytic reaction is produced that enables conversion of a portion of the methane to hydrogen. The hydrogen-splitting particles comprise a metal oxide. Historically, palladium, platinum and nickel have been used successfully to produce substantial hydrogen yields from methane. More recently, less costly metal oxides, used as combustion catalysts containing copper, manganese, iron or chromium, have been paired with a nickel reforming catalyst to carry out the partial oxidation of methane. These catalysts produce hydrogen yields that are comparable to platinum or palladium and nickel catalysts, but at significantly lower costs. Any of these materials, as well as a light source with optimized emission of the correct UV spectrum, are employed.

Referring back to FIG. 3A, light reactor module 180 includes a flow pipe 162, a section of pipe serving as a housing and also a carrier, along the interior circumferential wall surface, of materials serving to enable LSPR in the presence of appropriate UV light. Light reactor module 180 includes an inner pipe 172. Inner pipe 172 indicates a simple pipe, with sealed ends, coated on its exterior circumferential wall surface with LSPR-enabling materials similarly to flow pipe 162 in order to increase surface area for the photocatalytic reaction. Light reactor module 180 includes a UV light source 164. UV light source 164 is a spectrum-appropriate light source mounted to the inner surface of flow pipe 162 and represented as tubular in form and disposed longitudinally along the inner wall of flow pipe 162. FIG. 3B provides an axial view of light reactor module 180, with flow pipe 162, inner pipe 172 and UV light source 164. In FIG. 3B, UV light source 164 is shown abutting the interior wall of flow pipe 162.

Figure 4:
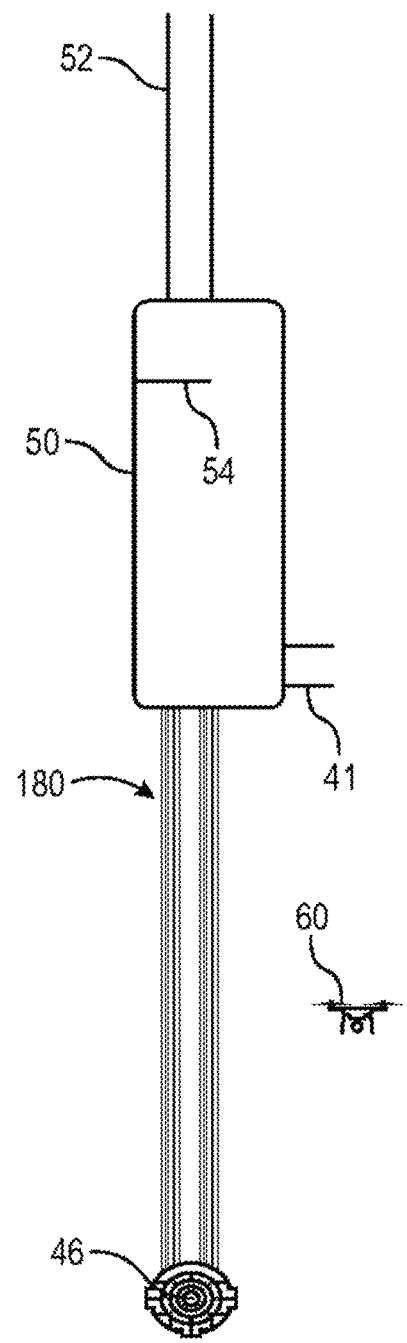
FIG. 4 illustrates the light reactor module installed downstream from separator, in accordance with one embodiment of the present invention.

FIG. 4 shows light reactor module 180 installed downstream from separator 50 as a standalone methane-reduction and hydrogen splitting effort (without the benefit of the preferred embodiment's system for introduction of a chemical catalyst mist as shown in FIG. 1). In FIG. 4, light reactor module 180 attaches to the gas outflow/downstream side of separator 50, with diverter plate 54, gas inflow line 52, liquid outflow line 41, and drone 60 visible. The present embodiment allows an operator to employ photocatalytic technology in standalone fashion without additional modules such as the chemical catalyst system of FIG. 1, a section(s) of flow line leading to a flare stack could be removed and replaced with a light reactor module(s) as in FIG. 4. Furthermore, additional light reactor modules 180 are employed end to end, additively, so as to provide more opportunity for the hydrogen-splitting reactions to take place, increasing yield.

Figure 2:
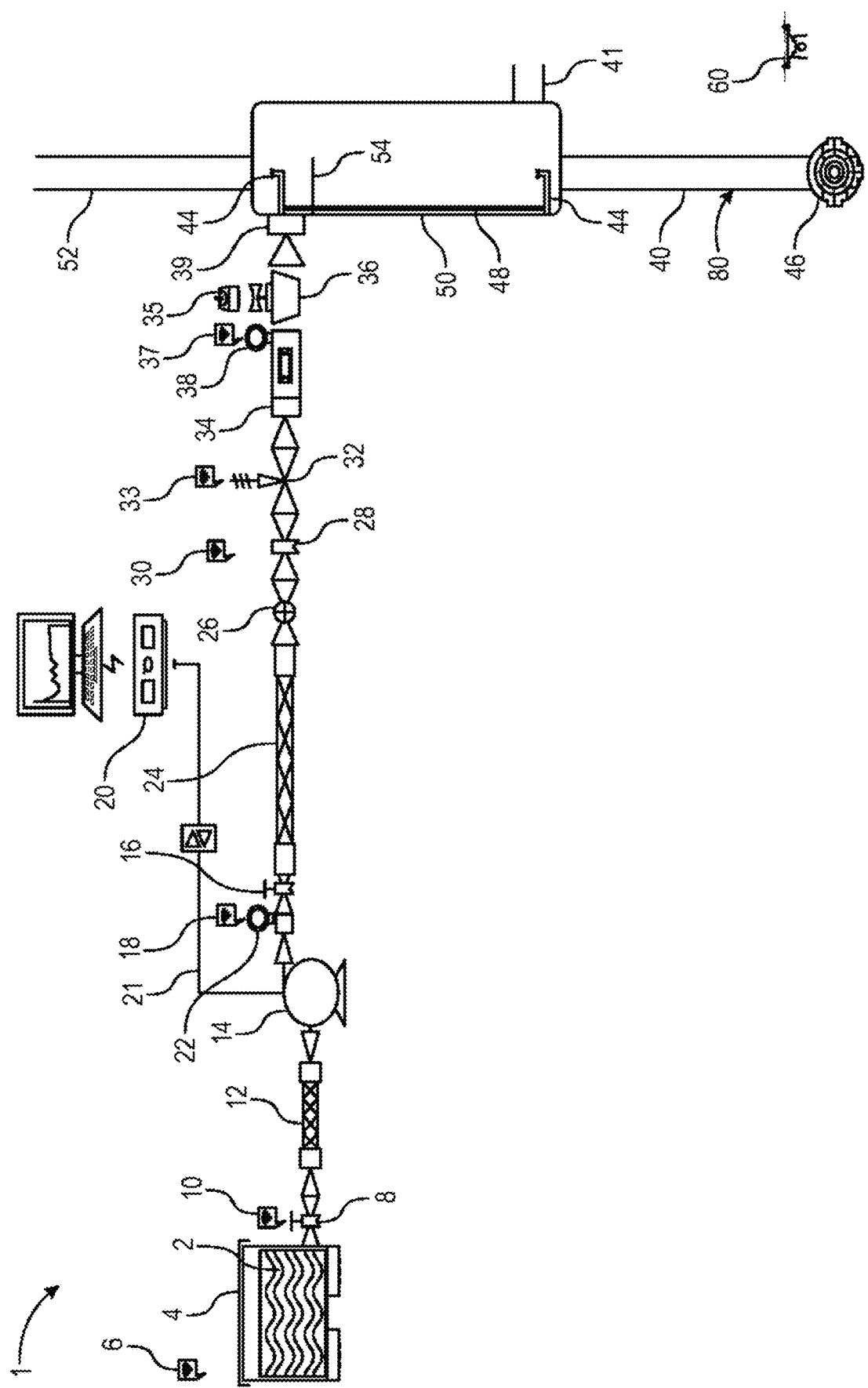
FIG. 2 illustrates a schematic representation of a system for limiting or eliminating environmentally harmful gas and liquid hydrocarbons, in accordance with another embodiment of the present invention.
Figure 5:
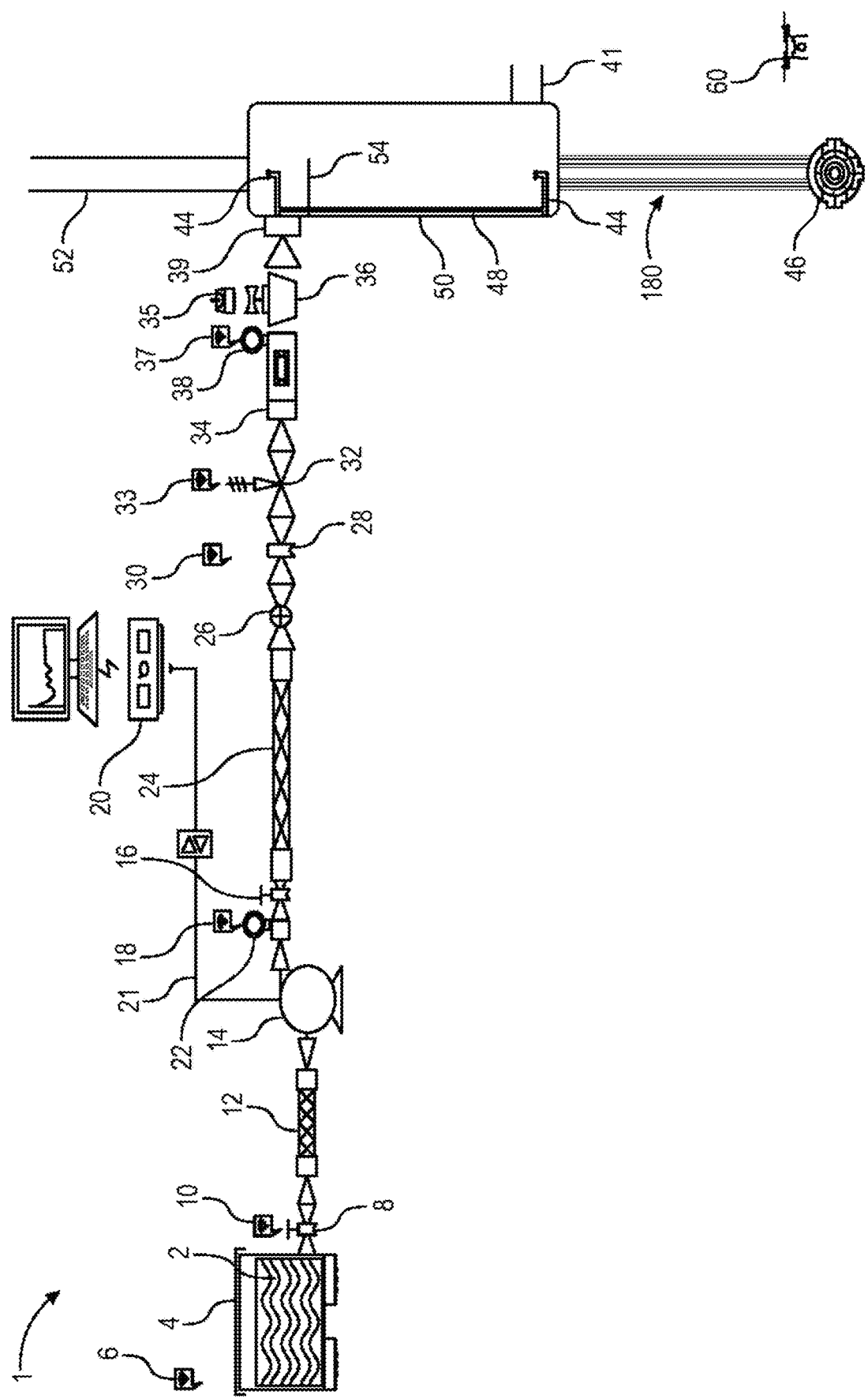
FIG. 5 illustrates the system as shown in FIG. 2 having multiple atomizing nozzles inside a separator, in accordance with one embodiment of the present invention.

FIG. 5 shows the chemical catalyst mist system of FIG. 2, including multiple atomizing nozzles 44 inside separator 50, combined with the light reactor module of FIG. 4 installed downstream of separator 50. The embodiment represented in FIG. 5 provides the benefit of both chemically and photo-reactively catalyzed reactions, providing two different means of methane reduction and hydrogen production in order to increase effectiveness of the operation.

Figure 6:
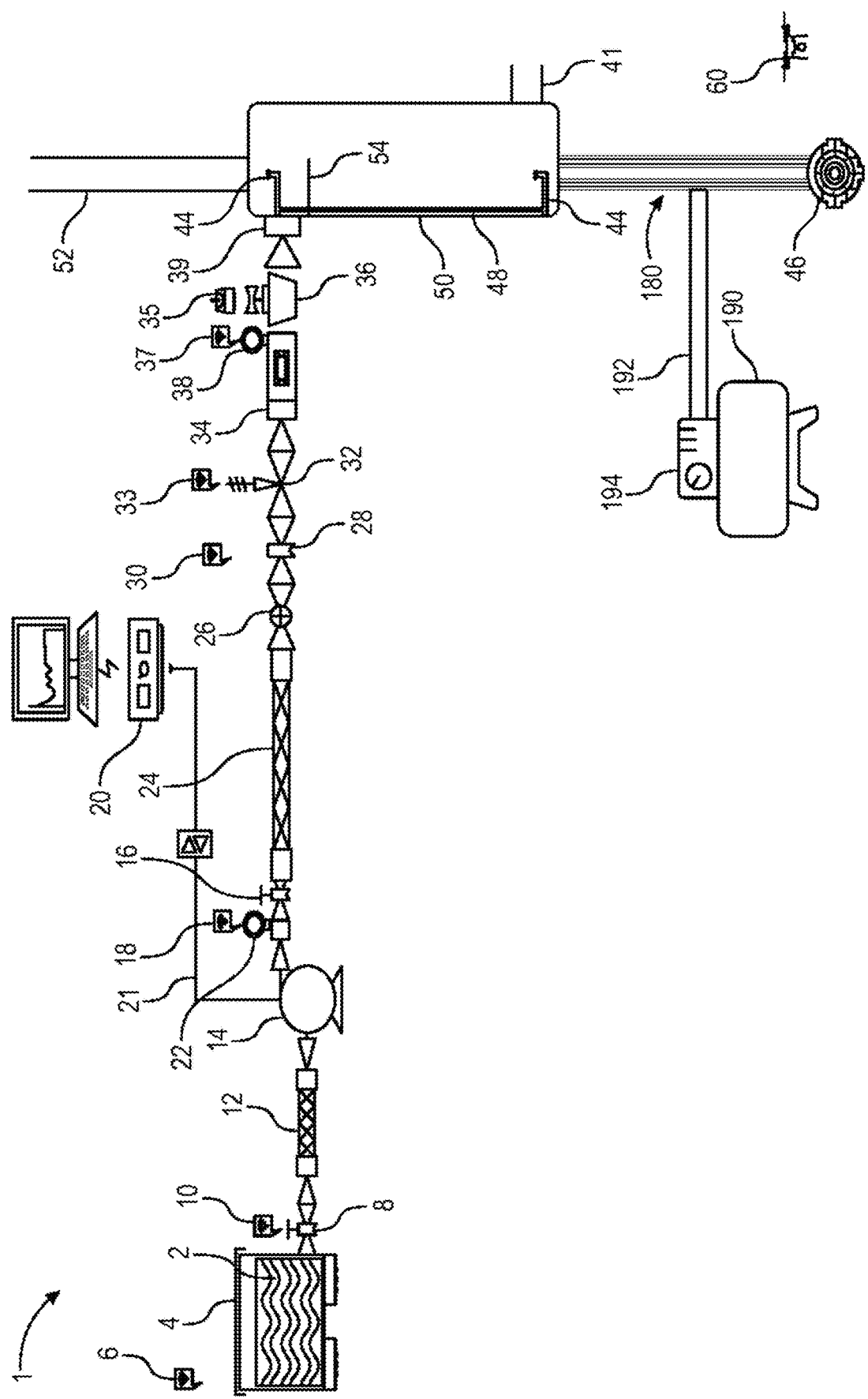
FIG. 6 illustrates the system as shown in FIG. 5 having the light reactor module connecting a hydrogen storage vessel, in accordance with one embodiment of the present invention.

FIG. 6 depicts the combined embodiment shown in FIG. 5, i.e., the chemical catalyst system combined with light reactor module 180, but with the further addition of a basic gas collection system. Here, light reactor module 180 connects to hydrogen storage vessel 190 via hydrogen offtake line 192. Hydrogen offtake line 192 ports into light reactor module 180 for receiving flowing gas composed of hydrogen, hydrogen and carbon monoxide (syngas), as well as some additional potential components, depending on the circumstances. Hydrogen storage vessel 190 includes compressor 194. Compressor 194 positions over hydrogen storage vessel 190 and connects both hydrogen offtake line 192 and hydrogen storage vessel 190. Compressor 194 compresses the gas flowing through hydrogen offtake line 192 such that it accumulates under pressure in hydrogen storage vessel 190. Remaining combustible gas (i.e., excess gas) exiting light reactor module 180 proceeds further downstream through the flare stack 46 to be combusted. In one exemplary implementation, other systems can be employed in addition to or in place of a compression system for hydrogen storage, such as, in particular, metal hydride-filled tanks (not shown) for hydrogen adsorption and storage.

FIGS. 7A and 7B show a hydroxyl generator system 170, in accordance with one embodiment of the present invention. The hydroxyl generator system 170 is added as another module to any of the embodiments presented above downstream of the separator, either as a single unit or in multiple units. Hydroxyl generator system 170 is a UVA-light driven system for generating hydroxyl radicals within the interior of hydroxyl generator flow pipe 176. Hydroxyl generator UVA light 178 is a spectrum-appropriate light source mounted to the inner surface of hydroxyl generator flow pipe 176, and is represented as tubular in form and in FIG. 7A disposed longitudinally along the inner wall of hydroxyl generator flow pipe 176. The interior wall of hydroxyl generator flow pipe 176 is coated with titanium dioxide ($TiO_2$) nanoparticles. FIG. 7B provides an axial view of hydroxyl generator flow pipe 176 and hydroxyl generator UVA lights 178.

Figure 8:
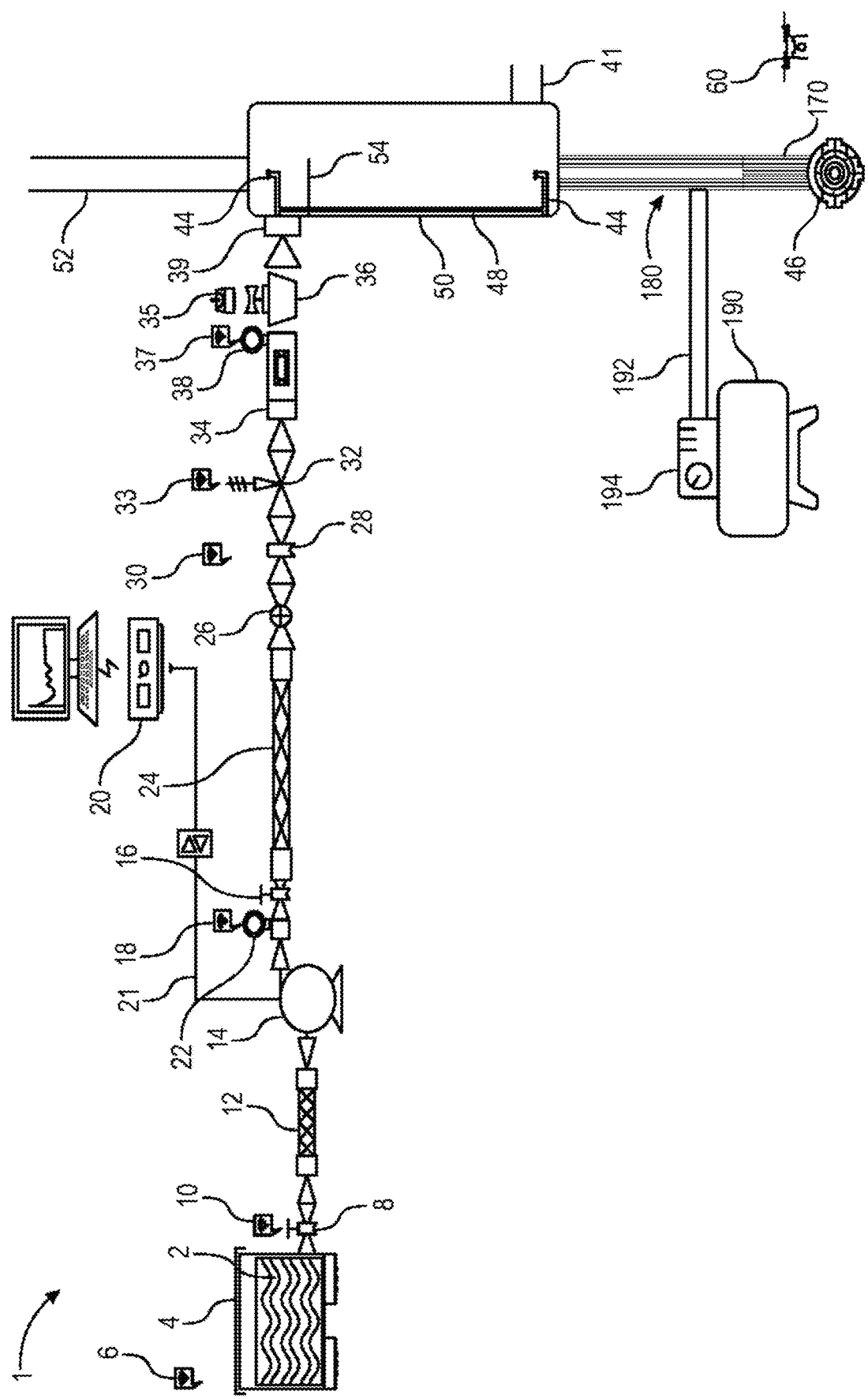
FIG. 8 illustrates the system as shown in FIG. 6 having the hydroxyl generator system, in accordance with one embodiment of the present invention.

FIG. 8 shows another embodiment with the same system components and function as in FIG. 6, with the addition of hydroxyl generator system 170. Hydroxyl generator system 170 is placed at any point between the separator and flare stack. In FIG. 8, hydroxyl generator system 170 attaches light reactor module 180 at its upstream end to and to flare stack 46 at its downstream end. By employing hydroxyl generator system 170, UVA (black light) in the 365 nm to 385 nm wavelength is produced by hydroxyl generator UVA lights 178 in order to irradiate titanium dioxide (TiO2) nanoparticles coating the interior wall of hydroxyl generator flow pipe in order to efficiently generate hydroxyl radicals. This process represents an additional photocatalytic reaction, much like the hydrogen-splitting, methane-reducing reaction taking place in light reactor module 180. Hydroxyl generator system 170 depicted in FIG. 8, is located downstream from the separator 50 and light reactor module 140. Gas of various components, and atomized water, at a minimum, are present and provide the molecules necessary for a reaction producing hydroxyl radicals. The chemical catalyst 2, with water as a significant component, is utilized in conjunction with hydroxyl generator system 170. When utilized optionally under the conditions depicted in the embodiments of this disclosure, the hydroxyl generator system 170 offers the feature of converting carbon monoxide to carbon dioxide. This may be desirable if carbon monoxide exiting the flare stack is considered more of a nuisance than carbon dioxide, or if potential collection of CO2 might be attempted through means not shown in this disclosure.

All embodiments described supra involve, in normal operation, the reduction of greenhouse gas emissions via the injection of chemical catalyst 2 into gas flow line 80 before the wellbore gas reaches the flare stack 46. In normal operation, the quantity, concentration or composition of chemical catalyst 2 is adjusted to permit minimal gas burn, i.e., a greatly reduced-size gas flare in comparison with gas flares that are typical in the industry. In addition to being of reduced size, the gas flare should also be cleaner burning, with chemical catalyst 2 having neutralized most harmful components of the gas, leaving mostly hydrogen and carbon monoxide (syngas) with residual methane gas to produce the flare. As described above, the residual gas is utilized in ways beyond simple flaring. The gas is collected and stored, converted into another form of fuel or chemical, or fed into a generator on-site and converted into electric power. On-site power generation provides an opportunity, when combined with computing power, for the disclosed embodiments to engage in the mining of cryptocurrencies such as Bitcoin, with examples of such methods disclosed in the U.S. Pat. No. 10,862,309, Systems and Methods for Generating and Consuming Power from Natural Gas (Cavness et al).

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

What is claimed is:

1. A system for reduction or elimination of environmentally harmful or greenhouse gases in situations in which gases comprised largely of gaseous hydrocarbons are flared or vented from an oil and gas well or chemical refinery, said system comprising:

a chemical catalyst, composed of a surfactant and water, for reacting with methane to produce gases including hydrogen and carbon monoxide;

a sequential arrangement of connected valves, hoses, lines, pipes and tanks assembled for conducting said chemical catalyst to flowing methane gas;

an atomizing nozzle ported through and disposed within a pipe of said pipes conducting flowing methane from a distally connected oil and gas well or chemical refinery to be flared or vented and with said atomizing nozzle for controllably spraying said chemical catalyst into said flowing methane; and sensors capable of detecting the molecular composition of resultant gas following the reaction of said chemical catalyst with said flowing methane.

2. The system of claim 1, said arrangement comprised of:

a storage tank for storing a supply of said chemical catalyst;

a valve for regulating outflow of said chemical catalyst from said storage tank;

a hose connected at a first, proximal end to said valve, and at a second, distal end to a pump, said hose utilized for flexibly conducting flow of said chemical catalyst to said pump with said pump for controllably advancing said chemical catalyst further downstream;

a pump valve with attached pressure gauge, connected to said pump, said pump valve for regulating outflow of said chemical catalyst from said pump in the downstream direction;

a high-pressure hose connected at a first, proximal end to said pump valve, and connected at a second, distal end to a pressure relief valve, said high pressure hose for flexibly conducting flow of said chemical catalyst from said pump valve to said pressure relief valve, said pressure relief valve for relieving excess system pressure resulting from unexpected overpressure of gas emanating from a distally connected oil and gas well or chemical refinery;

a flow control valve connected to said pressure relief valve, said flow control valve for regulating further downstream flow of said chemical catalyst;

a flow meter connected to said flow control valve, said flow meter for indicating rate of flow of said chemical catalyst;

a back flow valve connected to said flow meter, said back flow valve for preventing unexpected gas flow from a distally connected oil and gas well or chemical refinery from intruding further upstream into the system and causing potential damage; and a plug valve connected to said back flow valve, said plug valve for providing a master shutoff preventing either downstream flow of said chemical catalyst or upstream flow of gas from a distally connected oil and gas well or chemical refinery, with said shutoff being of particular utility for providing safety during system installation and maintenance and also in the event said back flow valve is overcome by flow in the upstream direction.

3. The system of claim 2, further comprising a computer, wherein said computer controls the injection of said chemical catalyst through electrically operable valves and pumps, said electrically operable valves and pumps including:
said valve for regulating outflow of said chemical catalyst from said storage tank;
said pump for controllably advancing said chemical catalyst further downstream; and
said pump valve for regulating outflow of said chemical catalyst from said pump in the downstream direction.

4. The system of claim 3, further comprising electronic sensors integrated into said valves and pumps and said flow meter, wherein said electronic sensors communicate data in real-time to said computer.

5. The system of claim 4, wherein said electronic sensors communicatively connect to metering equipment before a vent or flare point for determining quantities of key resultant gases following reaction and wherein said electronic sensors are positioned at or near a flare point for determining molecular composition at combustion, and wherein said electronic sensors and said metering equipment provide electronic data to said computer for determining credits, rebates, or legislative benefits for implementing environmental practices.

6. A system for reduction or elimination of environmentally harmful or greenhouse gases in situations in which gases comprised largely of gaseous hydrocarbons are flared or vented from an oil and gas well or chemical refinery, said system comprising:
a chemical catalyst, composed of a surfactant and water, for reacting with methane to produce gases including hydrogen and carbon monoxide;
a sequential arrangement of connected valves, hoses, lines, pipes and tanks assembled for conducting said chemical catalyst to flowing methane gas;
a first atomizing nozzle connected to a plug valve of said valves, said first atomizing nozzle located within a gas separator tank for treating incoming gas, including incoming methane gas, and disposed proximally to a gas inlet opening of said gas separator tank, with said first atomizing nozzle for dispersing a wide-spraying fine mist of received chemical catalyst into a stream of said incoming methane gas in order to efficiently facilitate a reaction within an area of turbulent flow;
a second atomizing nozzle connected to said plug valve, said second atomizing nozzle located within said gas separator tank and disposed proximally to a gas outlet opening of said gas separator tank, with said second atomizing nozzle for dispersing a wide-spraying fine mist of received chemical catalyst into a stream of outgoing gas, including residual, outgoing methane gas, in order to facilitate a reaction with said residual, outgoing methane gas as said stream of outgoing gas enters a line connecting said gas separator tank to a flare stack; and
sensors capable of detecting the molecular composition of resultant gas following the reaction of said chemical catalyst with methane gas.

7. The system of claim 6, said arrangement comprised of:
a storage tank for storing a supply of said chemical catalyst;
a valve for regulating outflow of said chemical catalyst from said storage tank;
a hose connected at a first, proximal end to said valve, and at a second, distal end to a pump, said hose utilized for flexibly conducting flow of said chemical catalyst to said pump with said pump for controllably advancing said chemical catalyst further downstream;
a pump valve with attached pressure gauge, connected to said pump, said pump valve for regulating outflow of said chemical catalyst from said pump in the downstream direction;
a high-pressure hose connected at a first, proximal end to said pump valve, and connected at a second, distal end to a pressure relief valve, said high pressure hose for flexibly conducting flow of said chemical catalyst from said pump valve to said pressure relief valve, said pressure relief valve for relieving excess system pressure resulting from unexpected overpressure of gas emanating from a distally connected oil and gas well;
a flow control valve connected to said pressure relief valve, said flow control valve for regulating further downstream flow of said chemical catalyst;
a flow meter connected to said flow control valve, said flow meter for indicating rate of flow of said chemical catalyst; and
a back flow valve connected to said flow meter, said back flow valve for preventing unexpected gas flow from a distally connected oil and gas well from intruding further upstream into the system and causing potential damage, and wherein said plug valve connects to said back flow valve, said plug valve for providing a master shutoff preventing either downstream flow of said chemical catalyst or upstream flow of gas from a distally connected oil and gas well, with said shutoff being of particular utility for providing safety during system installation and maintenance and also in the event said back flow valve is overcome by flow in the upstream direction.

8. The system of claim 7, wherein said storage tank includes a fluid level sensor connected to a computer via wired or wireless connection for alerting a remote operator of the need to refill said storage tank with said chemical catalyst; and further wherein
said valve regulating chemical catalyst outflow from said storage tank is electrically operable and is controllable by computer for remote operation;
said pump is controllable by computer for remote operation; said pump valve contains an integrated electronic pressure sensor and is controllable by computer for remote operation;
said pressure gauge connected to said pump is readable manually, or alternatively remotely by computer for remote data analysis and recordation;
said flow control valve is controllable by computer for remote operation; and
said flow meter contains an integrated flow sensor readable by computer for remote data analysis and recordation.

9. The system of claim 8, wherein said plug valve is controllable electrically by computer as well as manually onsite, with electrical operation being for faster response to an overpressure event when an operator is offsite in a remote location and with manual onsite control being for the purpose redundancy and reliability in the event the remote connection fails.

10. The system of claim 8, wherein said first atomizing nozzle is positioned upstream of and proximal to said gas separator tank and said second atomizing nozzle is positioned downstream of and proximal to said gas separator tank for cost reduction and convenience by avoiding the need for integration of said first atomizing nozzle and second atomizing nozzle into said gas separator tank.

11. The system of claim 7, further comprising a hydroxyl generator system housed in a section of said flow pipe, wherein said hydroxyl generator system is located downstream from said gas separator tank and upstream from said flare stack and generates hydroxyl radicals for converting a portion of carbon monoxide gas reactively produced from said chemical catalyst to carbon dioxide before exiting the flare stack.

12. The system of claim 6, further comprising a light reactor module, wherein said light reactor module is located downstream of said gas separator tank and utilizes ultraviolet light in conjunction with photocatalytic materials for enabling production of hydrogen from flowing methane gas.

13. The system of claim 12, wherein said light reactor module comprises a flow pipe, wherein a section of said flow pipe serves as a housing and a carrier, with sources of ultraviolet light attached to the interior circumferential wall surface and said interior circumferential wall surface coated with materials serving to enable localized surface plasmon resonance (LSPR) in the presence of the light, for enabling flowing methane gas to be converted to hydrogen.

14. The system of claim 13, wherein said light reactor module contains an additional, smaller diameter pipe housed internally within said flow pipe and with said smaller diameter pipe coated with materials serving to enable localized plasmon resonance (LSPR) in the presence of the ultraviolet light, increasing the surface area available for said LSPR to occur, for enabling additional capacity for converting flowing methane gas to hydrogen.

15. The system of claim 14, wherein said light reactor module connects to a hydrogen storage vessel having a compressor via a hydrogen offtake line, and wherein said compressor compresses the gas flowing through hydrogen offtake line for accumulating hydrogen gas under pressure in a hydrogen storage vessel.

16. The system of claim 14, wherein said light reactor module connects to a tank filled with metal hydride for providing hydrogen gas adsorption at relatively low pressure and temperature.

17. The system of claim 14, wherein remaining combustible gas, including residual hydrogen and carbon monoxide exiting the light reactor module, proceeds further downstream through the flare stack for combustion.

18. A method of reducing or eliminating environmentally harmful or greenhouse gases in situations in which gases comprised largely of gaseous hydrocarbons are flared or vented from an oil and gas well or chemical refinery, the method comprising the steps of:
providing a chemical catalyst, composed of a surfactant and water, for reacting with methane to produce gases including hydrogen and carbon monoxide;
providing a sequential arrangement of connected valves, hoses, lines, pipes and tanks assembled for conducting said chemical catalyst to flowing methane gas;
providing an atomizing nozzle ported through and disposed within a pipe of said pipes conducting flowing methane from a distally connected oil and gas well or chemical refinery to be flared or vented and with said atomizing nozzle for controllably spraying said chemical catalyst into said flowing methane;
providing sensors capable of detecting the molecular composition of resultant gas following the reaction of said chemical catalyst with said flowing methane; and
deploying said sensors upstream of, or in proximity with, a flare of said gaseous hydrocarbons.

19. The method of claim 18, further comprising the use of a light reactor module deployed downstream of said atomizing nozzle for enabling localized plasmon resonance (LSPR) as an additive means of converting methane to hydrogen.

20. The method of claim 18, further comprising controlling the injection of said chemical catalyst through electrically operable valves and pumps.

* * * * *